Feb. 14, 1939.  P. STRANDBERG  2,147,066

REFRIGERATION

Filed March 12, 1936

INVENTOR,
Paul Strandberg
BY
his ATTORNEY.

Patented Feb. 14, 1939

2,147,066

UNITED STATES PATENT OFFICE 2,147,066

REFRIGERATION

Paul Strandberg, Stockholm, Sweden, assignor, by mesne assignments, to Servel, Inc., New York, N. Y., a corporation of Delaware Application March 12, 1936, Serial No. 68,385
In Germany March 12, 1935

9 Claims. (Cl. 62—115)

My invention relates to a method of and apparatus for producing refrigeration in connection with an internal combustion engine for vehicles such as automobiles, motor boats or the like, and also for motor railways, or in connection with stationary engines.

It is an object of my invention to improve operation of an internal combustion engine and at the same time produce a greater amount of refrigeration in a system utilizing expansion of fluid fuel to produce cold and then introducing the fuel into the engine. I accomplish this by providing a lower pressure area for expansion of the fuel and then increasing the pressure before introduction into an engine.

Figure 1:
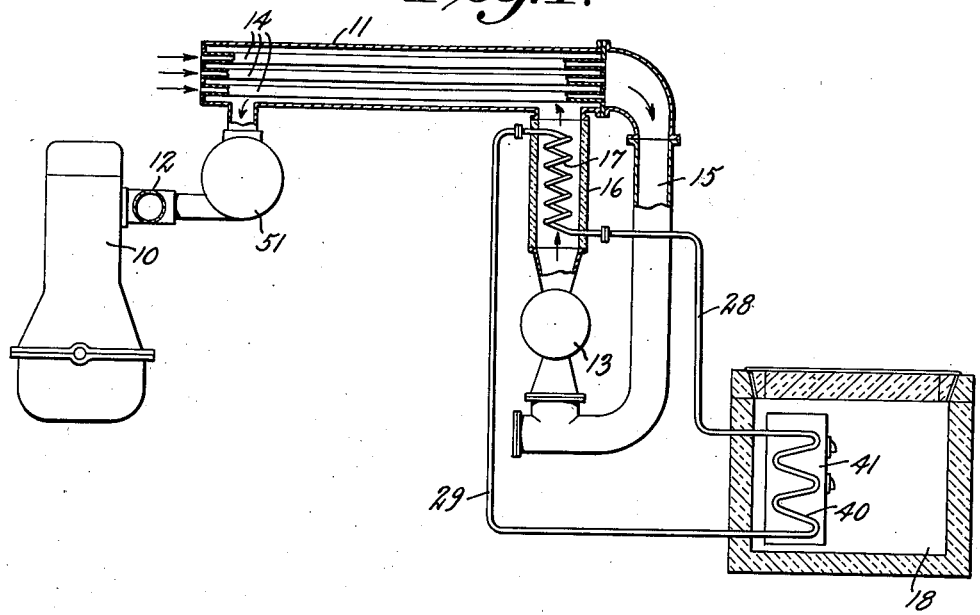
Figure 2:
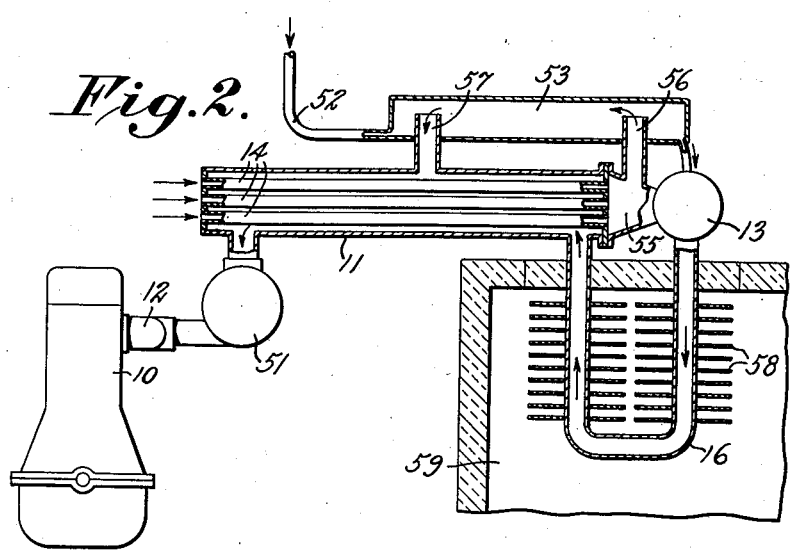

My invention, together with other objects and advantages thereof, will be more fully understood upon reference to the following description and the accompanying drawing forming a part of this specification and of which:

Fig. 1 shows more or less diagrammatically a refrigeration system combined with an internal combustion engine in accordance with the invention; and Fig. 2 illustrates more or less diagrammatically a modification of the invention.

In Fig. 1, reference character 10 designates a cylinder block of an internal combustion engine, for example, for an automobile. 11 is a supply pipe or duct for the air-gas mixture which is supplied through a suction inlet to a usual inlet manifold 12 and thence to the cylinders. A carburetor 13 is supplied with fresh air through a conduit 15 and tubes 14 arranged in heat exchange relation with the duct 11. Between the carburetor 13 and the duct 11 is arranged a well-insulated vaporization chamber or conduit member 16 which forms a part of the conduit leading to the intake manifold and which serves for the production of cold. Within this chamber is located a pipe coil 17 which is connected by conduits 28 and 29 to a second pipe coil 40 which is surrounded by a cooling body 41 located within a refrigerator cabinet 18. The pipe coils and the connecting conduits contain a fluid which absorbs heat from the refrigerating cabinet 18 and transfers this heat to the chamber 16 where the heat produces evaporation of the fuel for the engine. The auxiliary fluid may evaporate in the coil 40 and condense in the coil 17.

Between the duct 11 and the intake manifold 12, I provide a compressor 51. The compressor 51 may be driven, for instance, by the engine. The compressor 51 withdraws air-gas mixture from the duct 11 and compresses this mixture prior to entrance into the engine.

Operation is as follows:

When the engine is started, atmospheric air enters the pipes 14 which are open at one end, and flows through the conduit 15 and thence to the carburetor 13 in which the fuel, for example, liquid benzene or gasoline, is atomized and passes in a finely divided condition together with the air into the vaporization chamber 16 in which the small liquid particles are evaporated. Within chamber 16 there is a pressure below atmospheric, due to the suction of the compressor 51. Due to this evaporation, heat is taken from the surroundings, and this heat can only be withdrawn from the coil 17 since the vaporization chamber 16 is well insulated. The air saturated with fuel vapor flows from the vaporization chamber 16 through the duct 11 and thence into the compressor 51 from which it is discharged at increased pressure into the intake manifold 12 for delivery to the cylinders of the internal combustion engine. The air-gas mixture flowing in duct 11 cools the incoming fresh air in the conduits 14. The duct 11 and the conduits 14 comprise a heat exchanger.

The cold produced in the vaporization chamber 16 is transferred by the fluid in the coil 17 to the part to be cooled, such as the refrigerator cabinet 18, in a known manner as previously described.

The compressor 51 does two things. It decreases the pressure in the vaporization chamber 16 below that obtainable only by suction of the engine whereby lower refrigeration temperatures are obtained. The compressor also increases the pressure at which the air-gas mixture enters the internal combustion engine, whereby the efficiency of the engine is increased.

In Fig. 2 there is illustrated a modification of the invention in which the vaporization or cooling chamber 16 is located directly in a compartment 59 to be cooled, and is provided with heat transfer fins 58. In this modification liquid fuel flowing to the carburetor 13 is pre-cooled by flowing the liquid in contact with air which has been cooled in the heat exchanger tubes 14. Corresponding parts in Figs. 1 and 2 are indicated by the same reference numerals. Liquid fuel flows from a fuel tank, not shown, through conduit 52 to the carburetor 13. Conduit 52 is provided with an enlarged chamber 53. Conduits 56 and 57 are connected from a header 55 for the tubes 14 and the duct 11 respectively to the upper part of the chamber 53 adjacent opposite ends thereof.

The operation of the arrangement illustrated in Fig. 2 is the same as described in connection with the arrangement shown in Fig. 1 except that heat is transferred directly from the refrigerator 59 to the vaporization or cooling chamber 16, and liquid fuel flowing to the carburetor 13 is pre-cooled in the chamber 53 by cool air which enters chamber 53 through conduit 56 and enters the duct 11 through conduit 57. Pre-cooling of the liquid in chamber 53 results in increased cooling in the vaporization chamber 16.

It will be understood that various other changes and modifications may be made within the scope of the invention as indicated in the following claims.

What is claimed is:

1. A method of refrigeration with the aid of an internal combustion engine which consists in producing a region of pressure lower than that obtainable by the suction action of said engine, introducing liquid fuel and air into said region, vaporizing said fuel to form a combustible mixture, supplying heat for vaporizing said fuel from a body to be cooled, cooling air before introduction into said region by heat transfer to said mixture, cooling liquid fuel before introduction into said region by heat transfer to a portion of the pre-cooled air, mixing said portion of air with said combustible mixture, increasing the pressure of the combustible mixture, and introducing the mixture at the increased pressure into said engine.

2. A method of refrigeration with the aid of an internal combustion engine which consists in producing a region of low pressure, introducing liquid fuel and air into said region, vaporizing said fuel to form a combustible mixture, supplying heat for vaporizing said fuel from a body to be cooled, cooling air before introduction into said region by heat transfer to said mixture, cooling liquid fuel before introduction into said region by heat transfer to a portion of the pre-cooled air, mixing said portion of air with said combustible mixture, and introducing the mixture into said engine.

3. A method of refrigeration with the aid of an internal combustion engine which consists in introducing liquid fuel and air into a region of cooling, vaporizing said fuel to form a combustible mixture, supplying heat for vaporizing said fuel from a body to be cooled, cooling air before introduction into said region by heat transfer to said mixture, cooling liquid fuel before introduction into said region by heat transfer to a portion of the pre-cooled air, mixing said portion of air with said combustible mixture, and introducing the mixture into said engine.

4. A method of refrigeration with the aid of an internal combustion engine which consists in introducing liquid fuel and air into region of cooling, vaporizing said fuel to form a combustible mixture, supplying heat for vaporizing said fuel from a body to be cooled, cooling air before introduction into said region by heat transfer to said mixture, cooling liquid fuel before introduction into said region by heat transfer to said combustible mixture, and introducing the mixture into said engine.

5. A method of refrigeration with the aid of an internal combustion engine operating on liquid fuel and air supplied thereto which comprises vaporizing said liquid fuel, supplying heat for said vaporization from a body to be cooled external to the path of flow of fluids supplied to the engine, forming a combustible mixture of the vaporized fuel and air, cooling said liquid fuel prior to said vaporization by heat transfer to said combustible mixture, and introducing the combustible mixture into said engine.

6. Refrigeration apparatus including an internal combustion engine, a cooling member, means for conducting air to said cooling member including a heat exchanger, means for conducting liquid fuel to said cooling member including a carburetor, means for conducting combustible mixture from said cooling member to said engine including said heat exchanger and a compressor whereby the mixture cools the air and the pressure of the combustible mixture is increased before reaching the engine, and means for conducting a portion of the air after passage through said heat exchanger into contact with liquid fuel flowing to said carburetor for cooling the fuel and thence into the presence of combustible mixture prior to compression thereof.

7. Refrigeration apparatus including an internal combustion engine, a cooling member, means for conducting air to said cooling member including a heat exchanger, means for conducting liquid fuel to said cooling member including a carburetor, means for conducting combustible mixture from said cooling member to said engine including said heat exchanger whereby the mixture cools the air, and means for conducting a portion of the air after passage through said heat exchanger into contact with liquid fuel flowing to said carburetor and thence into the presence of combustible mixture.

8. Refrigeration apparatus including an internal combustion engine, a cooling member, means for conducting air to said cooling member including a heat exchanger, means for conducting liquid fuel to said cooling member including a carburetor, means for conducting combustible mixture from said cooling member to said engine including said heat exchanger whereby the mixture cools the air, and means for transferring heat to said combustible mixture from liquid fuel flowing to said carburetor.

9. In combination, an internal combustion engine, refrigeration apparatus including a cooling element, means for supplying air and volatile liquid fuel to said element while reducing the pressure thereof, means for supplying combustible mixture of air and vaporous fuel to said engine, and means for transferring heat to said mixture from said liquid fuel before introduction thereof into said cooling element.

PAUL STRANDBERG.